(12) United States Patent
Wiencrot et al.

(10) Patent No.: US 11,156,457 B2
(45) Date of Patent: Oct. 26, 2021

(54) SYSTEMS AND METHODS FOR DEVICE DETECTION OF PRESENCE AND MANIPULATIONS

(71) Applicant: Sphero, Inc., Boulder, CO (US)

(72) Inventors: Jeff Wiencrot, Boulder, CO (US); Grant Fritz, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 44 days.

(21) Appl. No.: 16/220,555

(22) Filed: Dec. 14, 2018

(65) Prior Publication Data

US 2019/0186915 A1 Jun. 20, 2019

Related U.S. Application Data

(60) Provisional application No. 62/598,647, filed on Dec. 14, 2017.

(51) Int. Cl.
*G01C 19/02* (2006.01)
*G01C 19/5726* (2012.01)
*G01P 13/00* (2006.01)

(52) U.S. Cl.
CPC ......... *G01C 19/02* (2013.01); *G01C 19/5726* (2013.01); *G01P 9/02* (2013.01); *G01P 13/00* (2013.01)

(58) Field of Classification Search
CPC ..... G01C 19/02; G01C 19/5726; G01P 13/00; G01P 9/02; A63H 30/04; A63H 33/005; A63H 33/26; B60R 11/00; B60R 2011/007; B62D 39/00; B62D 61/00; G05D 1/0016; G05D 1/0022; G05D 1/027; G05D 2201/0214; Y10S 901/01
See application file for complete search history.

(56) References Cited

U.S. PATENT DOCUMENTS

| 10,275,036 | B2* | 4/2019 | Hygh ...................... A63F 13/28 |
| 2011/0060492 | A1* | 3/2011 | Kaznov ................... B60L 53/68 701/27 |
| 2011/0166763 | A1* | 7/2011 | Choi ..................... G05D 1/0272 701/82 |
| 2012/0168241 | A1* | 7/2012 | Bernstein ............... A63H 30/04 180/167 |
| 2015/0175202 | A1* | 6/2015 | MacGregor .......... B62K 11/007 701/2 |
| 2015/0224941 | A1* | 8/2015 | Bernstein ............. A63H 33/005 180/167 |
| 2015/0271991 | A1* | 10/2015 | Balutis ................. G05D 1/0221 700/264 |

* cited by examiner

*Primary Examiner* — Vinh Luong (57) ABSTRACT

Disposed within the body of a robotic device are an output element, accelerometer, gyroscope, and processor. The accelerometer sends a signal to the processor in response to detection of a vibration external to the body. The gyroscope sends a signal to the processor in response to a detection of movement of the body. The processor then sends an action signal to the output element based on the signals received from the accelerometer and gyroscope.

15 Claims, 7 Drawing Sheets

SYSTEMS AND METHODS FOR DEVICE DETECTION OF PRESENCE AND MANIPULATIONS

CROSS-REFERENCE TO RELATED APPLICATIONS

This application claims priority to and the benefit of U.S. Provisional Patent Application Ser. No. 62/598,647, filed Dec. 14, 2017, entitled "Systems and Methods for Detecting Presence and Manipulations," the disclosure of which is incorporated by reference herein in its entirety.

INTRODUCTION

Robotic devices may be stationary or mobile and may be programmed to improve the interactions with a user or other human or entity. Some interactions require detection of the presence of an entity within the robot's environment. Such presence detection may utilize one or more cameras that capture images of the environment for contemporaneous image processing. Image recognition software may be used to detect, differentiate, and identify occupants of an environment. In another example, microphone(s) associated with the robot may be used to detect sounds that may be indicative of the presence of an entity in the environment. However, such camera- and microphone-based detection systems implicate potential privacy concerns. Additionally, cameras, microphones, image- and sound-recognition software, and other components may drain power from the robot's limited power supply.

SUMMARY

In one aspect, the technology relates to a robotic device having: a body; an output element disposed in the body; at least one of: an accelerometer disposed within the body, wherein the accelerometer is configured to send an accelerometer signal in response to a detection of a vibration external to the body; and a gyroscope disposed within the body, wherein the gyroscope is configured to send a gyroscope signal in response to a detection of movement of the body; and at least one processor disposed in the body and communicatively coupled to at least one of the accelerometer and the gyroscope, wherein the processor is configured to receive at least one of the accelerometer signal and the gyroscope signal, and wherein the processor is configured to send an action signal to the output element based at least in part on receipt of at least one of the accelerometer signal and the gyroscope signal. In an example, the received signal is the accelerometer signal. In another example, the received signal is the gyroscope signal. In yet another example, the output element includes at least one of a speaker, a light, and a motor. In still another example, the motor includes at least one of a body motor and an accessory motor.

In another example of the above aspect, the action signal is sent when at least one of the accelerometer signal and the gyroscope signal meet a predetermined condition. In an example, the predetermined condition of the accelerometer signal corresponds to at least one of a vibration in excess of a threshold and a vibration substantially matching a predetermined pattern. In another example, the at least one of the accelerometer signal and the gyroscope signal are sent when at least one of the vibration and the movement meet a predetermined condition.

In another aspect, the technology relates to a robotic device having: a body; a output element disposed in the body; a plurality of accelerometers disposed in the body; and at least one processor disposed in the body and communicatively coupled to the plurality of accelerometers, wherein the at least one processor is configured to: receive a signal from each of the plurality of accelerometers, compare the signals received from each of the plurality of accelerometers, and determine a direction of a source of a vibration external to the body based at least in part on the comparison. In an example, the processor is further configured to send an action signal based at least in part on the determination. In another example, the comparison includes at least one of a time comparison, a magnitude comparison, a phase comparison, and a pattern comparison. In yet another example, the output element includes at least one of an audible emission output element, a visual emission output element, and a motor. In still another example, the plurality of accelerometers include three accelerometers.

In another aspect, the technology relates to a method of controlling a robotic device having a body, the method including: receiving a vibration signal from an accelerometer disposed in the body; receiving a gyroscope signal from a gyroscope disposed in the body; comparing the vibration signal to a first predetermined condition; comparing the gyroscope signal to a second predetermined condition; sending an action signal to an output element if at least one of (1) the vibration signal meets the predetermined condition and (2) the gyroscope signal meets the second predetermined condition. In an example, the method further including activating the output element based on the action signal. In another example, the output element includes at least one of a motor, a light, and a speaker. In yet another example, the motor includes at least one of an accessory motor and a body motor. In still another example, at least one of the first predetermined condition and the second predetermined condition each include a magnitude, a time, a phase, and a pattern.

In another example of the above aspect, the method further including disabling at least one of the accelerometer and the gyroscope when the robotic device is moving due to a motor output. In an example, the method further including disregarding at least one of the vibration signal and the gyroscope signal when the robotic device is moving due to a motor output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

A robotic device is disclosed that includes a housing (that may be spherical, cylindrical, or otherwise) and an internal drive system including one or more motors coupled to one or more wheels. A biasing mechanism, including a spring and a contact end, may be coupled to the internal drive system to provide an opposing force between the wheels and contact end to allow for power to the motors to be transferred to the inner surface of the housing, causing the self-propelled device to roll along a surface. The self-propelled device can rotate based on a combination of movement of its center of mass, independent power to the motors, and the force of the biasing mechanism against the inner surface. A magnetic coupling component may be included with the biasing mechanism. The magnetic coupling component can include ferrous metal or a permanent magnet, such as a neodymium magnet, to provide a magnetic field through the housing to magnetically interact with external devices or accessories.

An external accessory, if included, may include a magnetic coupling component to magnetically couple with the magnetic coupling component of the biasing mechanism (e.g., the contact end). Accordingly, when the housing of the self-propelled device is caused to roll, the external accessory can remain stably coupled to the contact end of the biasing mechanism via magnetic interaction through the spherical housing, without the need for mechanical fasteners.

Either the self-propelled device or the external accessory, or both, can include a magnet (e.g., a neodymium magnet) to produce the magnetic field causing the magnetic interaction. Such interaction may involve a magnetic attraction in which contact occurs between the external accessory and the outer surface of the housing. In such examples, friction may be reduced by coating the outer surface of the housing and/or a contact surface of the external accessory with a substantially frictionless material. Additionally or alternatively, the magnetic interaction may involve a repulsive force including stability mechanism (e.g., one or more further magnets) to create stable magnetic levitation between the external accessory and the housing.

In other examples, the self-propelled device may include exterior wheels that engage with a ground or floor surface so as to propel the self-propelled device there along. Other accessories need not may be magnetically engaged, but may be physically engaged with a housing of the self-propelled device. Such accessories (whether physically or magnetically engaged) may be configured to move relative to the main housing of the device. When such accessories are used to depict an appendage (e.g., a head of a robot), the self-propelled device may be configured to move the appendage so as to mimic the appearance of a turning or lifting thereof. As such, the self-propelled device may be configured to appear to move its "head," so as to increase an interactive user experience with the self-propelled device. As used herein, the self-propelled device may also be referred to as a robotic device.

Figure 1:
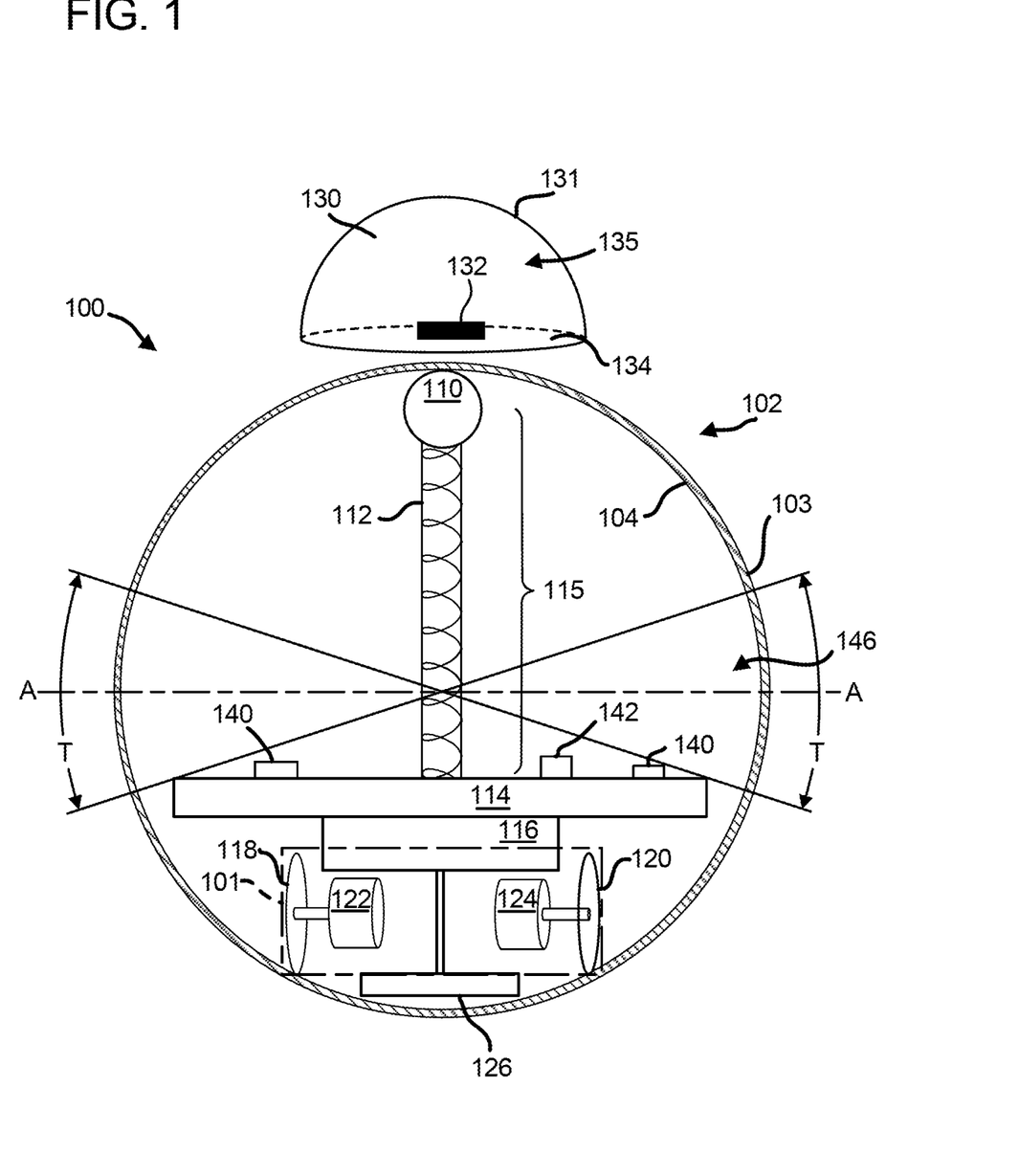
FIG. 1 depicts a perspective view of a first example of a robotic device.

FIG. 1 illustrates an example of a self-propelled body or device 100, and shows a schematic illustrating components of a spherical self-propelled device. However, variations of the present disclosure are not limited to such devices. The self-propelled device 100 can be of a size and weight allowing it to be easily grasped, lifted, and carried. The self-propelled device 100 can include a spherical casing or housing 102 with an outer surface 103 that makes contact with an external surface (e.g. ground, floor) as the device 100 rolls. In addition, the spherical housing 102 includes an inner surface 104. Additionally, the self-propelled device 100 includes several mechanical and electronic components enclosed by the spherical housing 102.

The spherical housing 102 can be made of a material that transmits signals used for wireless communication, yet are impervious to moisture, dirt, and other contaminants. The material may be durable, washable, and/or shatter-resistant. The spherical housing 102 may also be structured to enable transmission of light and can be textured to diffuse light generated by an internal light source (not shown). In one example, the housing is made of sealed polycarbonate plastic. Furthermore, the spherical housing 102 can include one or more surfaces that are textured to diffuse light. In one example, the spherical housing 102 includes two hemispherical shells with an associated attachment mechanism, such that the spherical housing 102 can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 101 to enable the device 100 to propel itself. The drive system 101 can be coupled to processing resources and other control mechanisms, as described elsewhere herein. The carrier 114 serves as the attachment point and support for components of the drive system 101. The components of the drive system 101 are not rigidly attached to the spherical housing 102. Instead, the drive system 101 can include a pair of drive elements, such as wheels 118, 120 that are in frictional contact with the inner surface 104 of the spherical housing 102.

The carrier 114 is in mechanical and electrical contact with an energy storage device 116. The energy storage 116 provides a reservoir of energy to power the device 100 and electronics and can be replenished through an inductive charge port 126. The energy storage 116, in one example, is a rechargeable battery. In one variation, the battery is composed of lithium-polymer cells. In other variations, other rechargeable battery chemistries are used. The carrier 114 can provide the mounting location for most of the internal components, including printed circuit boards for processors, electronic assemblies, sensor arrays, antennas, and connectors, as well as providing a mechanical attachment point for internal components. Relevant to the present technology, one or more accelerometers 140 are disposed in or on the carrier 114. A gyroscope 142 may also be disposed thereon. The accelerometer 140 should have a resolution high enough to distinguish the signal levels, as well as have a noise floor low enough to distinguish the signal from noise. Additionally, it may be desirable that the accelerometer can read and report signals high enough to exceed the detection threshold. Performance considerations for the gyroscope 142 may be similar.

The drive system 101 can include motors 122, 124 and wheels 118, 120. The motors 122 and 124 connect to the wheels 118 and 120, respectively, each through an associated shaft, axle, and gear drive (not shown). The perimeter of wheels 118 and 120 are two points where the interior mechanism is in mechanical contact with inner surface 104. The points where wheels 118 and 120 contact inner surface 104 may be coated with a material to increase friction and reduce slippage. For example, the wheels 118 and 120 can be covered with silicone rubber tires.

In some variations, a biasing mechanism 115 is provided to actively force the wheels 118, 120 against the inner surface 104. In an example provided, elements such as a spring 112 and a spring end 110 can include the biasing mechanism 115. More specifically, the spring 112 and the spring end 110 are positioned to contact inner surface 104 at a point general opposite to the wheels 118 and 120. More specifically, the spring end 110 acts as bearing for forcing the wheels 118, 120 into the inner surface 104. The spring 112 and the spring end 110 provide additional contact force to reduce slippage of the wheels 118 and 120, particularly in situations where the interior mechanism is not positioned with the wheels at the bottom and where gravity does not provide adequate force to prevent the drive wheels 118, 120 from slipping. The spring 112 is selected to provide a force to press the wheels 118, 120 and the spring end 110 against inner surface 104.

The spring end 110 can be designed to provide near-frictionless contact with the inner surface 104. The spring end 110 can include a rounded surface configured to mirror a low-friction contact region at all contact points with the inner surface 104. Additional means of providing near-frictionless contact may be provided. In another implementation, the rounded surface may include one or more bearings to further reduce friction at the contact point where end 110 moves along inner surface 104. The spring 112 and the spring end 110 can be made of a non-magnetic material to avoid interference with magnetic sensors. However, in variations, the spring end 110 can include one or more retaining elements such as magnetic components to magnetically couple to an external accessory 130.

In some examples, the spring 112 has a spring constant such that the wheels 118, 120 and the spring end 110 are almost constantly engaged to the inner surface 104 of the spherical housing 102. As such, much of the power from the motors 122, 124 is transferred directly to rotating the spherical housing 102, as opposed to causing the internal components (i.e., the biasing mechanism 115 and internal drive system 101) to pitch. Thus, while motion of the self-propelled device 100 may be caused, at least partially, by pitching the internal components (and therefore the center of mass), motion may also be directly caused by active force of the wheels 118, 120 against the inner surface 104 of the spherical housing 102 (via the biasing mechanism 115) and direct transfer of electrical power from the motors 122, 124 to the wheels 118, 120. As such, the pitch of the biasing mechanism 115 may be substantially reduced, and remain substantially constant (e.g., substantially perpendicular to the external surface on which the self-propelled device 100 moves). Additionally or as an alternative, the pitch of the biasing mechanism 115 may increase (e.g., to over 45 degrees) during periods of hard acceleration or deceleration. Furthermore, under normal operating conditions, the pitch of the biasing mechanism 115, can remain stable or subtly vary (e.g., within 10-15 degrees). Pitch and changes therein may be detected, for example, by the gyroscope 142.

The force of the wheels 118, 120 against the inner surface 104 of the spherical housing 102 causes rotation of the housing 102, so as to move the device 100 across a surface. When the self-propelled device is moving in a substantially straight line, the motors 122, 124 rotate the wheels 118, 120 such that the housing 102 rotates about a generally horizontal axis A. Under such conditioned, the coils 140, 142 are disposed generally parallel to the axis A. Differential rotation of the wheels 118, 120 causes the housing 102 to change direction of rotation (e.g., to turn to the right or the left), and the internal components to pitch, as described above. During such turning operations, the axis A about which the housing 102 rotates may tilt T to positions depicted by the dashed lines. The gyroscope 142 is utilized to detect a tilt T of the carrier 114, and/or components of the drive system 101. In other examples, the gyroscope 142 may simply detect motion indicative of movement of the robotic device 100, in general (e.g., not movement associated with a specific internal component). Detection of titling T of the internal components or of the robotic device 100 itself causes the gyroscope 142 to send associated signals to a processor for processing. Titling not caused by interaction with an exterior object (e.g., by the device 100 rolling up a ramp), may be determined by the processor to mean that the device 100 has been acted upon by an external force (e.g., the device 100 may have been picked up, kicked, rolled, etc.). In response thereto, the device 100 may take an action, such as those described herein.

The device 100 may also include one or more output elements. The output elements may be any component that may perform some type of action. For example, the output element may include a light such as an LED, or may include a speaker such as a piezoelectric speaker. In the case of the light, emission may occur when an appropriate signal is sent from a processor (described below), while the speaker 146 may emit a sound. In another example, the output element may include one or more of the motors 122, 124, which may cause the robot 100 to move if required or desired. Activation of the output elements based on signals sent from the accelerometer(s) 140 and/or the gyroscope 142 is described in more detail below.

The spring end 110 can be formed of a magnetic metal that can be attracted to a magnet. Such metals can include iron, nickel, cobalt, gadolinium, neodymium, samarium, or metal alloys containing proportions of these metals. Alternatively, the spring end 110 can include a substantially frictionless contact portion, in contact with the inner surface 104 of the spherical housing 102, and a magnetically interactive portion, in contact or non-contact with an inner surface 104, including the above metals or metal alloys. The substantially frictionless contact portion can be an organic polymer such as a thermoplastic or thermosetting polymer. Alternatively, the spring end 110 can be formed of a magnet, such as a polished neodymium permanent magnet. In such variations, the spring end 110 can produce a magnetic field extending beyond the outer surface of the spherical housing 102 to magnetically couple with an external second body, in this case an accessory device 130. Alternatively still, the spring end 110 can be a substantially frictionless contact portion, and have a magnet included therein. Alternatively still, the magnetic component of the self-propelled device 100 may be included on any internal component, such as the spring 112 or the carrier 114, or an additional component coupled to the biasing mechanism 115 or the carrier 114.

Additionally or alternatively, the external accessory device 130 can include a retaining element such as a magnetic component 132 to magnetically couple with the biasing mechanism 115 (e.g., the spring end 110). The magnetic component 132 can be a permanent magnet, such as a neodymium magnet. In such variations, the magnetic component 132 can magnetically couple to the spring end 110. As such, the magnetic field produced by the magnetic component 132 can extend through the spherical housing 102 to remain in magnetic contact with the spring end 110.

Alternatively, the magnetic component 132 of the external accessory device 130 can be a magnetic metal that can be attracted to a magnet that forms the spring end 110. As stated above, such metals can include iron, nickel, cobalt, gadolinium, neodymium, samarium, or metal alloys containing proportions of these metals.

In further examples, one or more of the spring end 110 and the magnetic component can include any number of electro magnets or permanent magnets. Such magnets may be irregular in shape to provide added magnetic stability upon motion of the self-propelled device 100. For example, the magnetic component 132 of the accessory device 130 can be a single or multiple magnetic strips including one or more tributary strips to couple with a single or multiple correspondingly shaped magnets included on the spring end 110. Furthermore, multiple magnets may be dispersed through the external accessory device 130 and the spring end 110 to provide additional stability.

Alternatively, the spring end 110 and external accessory device 130 can be in a stable magnetically repulsive state as the self-propelled device 100 moves. In such variations, either the magnetic component 132 or the spring end 110 can include a superconductor material to substantially eliminate dynamic instability of a repelling magnetic force in order to allow for stable magnetic levitation of the accessory device in relation to the spring end 110 while the spherical housing 102 rotates therebetween. In similar variations, a diamagnetic material may be included in one or more of the self-propelled device 100, spring end 110, or the external accessory device 130 and can provide stability for magnetic levitation. Thus, without the use of guiderails or a magnetic track, the self-propelled device 100 may be caused to maneuver in any direction with the external accessory device 130 remaining in a substantially constant position along a vertical axis of the self-propelled device (Cartesian or cylindrical z-axis, or spherical r-coordinate with no polar angle ($\theta$)).

The external accessory device 130 can have a casing or housing 131 in the form of any shape and can be manufactured of any suitable material. A contact surface 134 of the external accessory device, or a surface closest to the outer surface of the spherical housing 102 (during magnetic interaction), can be formed to substantially correspond to the outer surface 103 of the spherical housing 102. As such, both the spherical housing 102 of the self-propelled device 100 and the external accessory device 130, namely the contact surface 134, can have substantially equivalent radii of curvature. In certain variation, this radius of curvature can be approximately 10-30 cm. However, it is contemplated that other examples of self-propelled devices and accompanying external accessory devices may have a radius on the order of one meter upwards to the size of a human transportation vehicle and beyond. As such, magnetic coupling or interaction may be achieved using powerful electromagnets disposed within the self-propelled device 100 to couple with the external accessory device 130, which may be configured to perform actions, carry payload, include a novel design, represent a character or figure, or the like.

The contact surface 134 of the external accessory device 130 can be formed or coated with a substantially frictionless material, such as a synthetic compound or suitable polymer. Other suitable compounds include TEFLON® brand polytetrafluoroethylene (PTFE) or DELRIN® brand polyoxymethylene (POM) coatings. However, any substantially frictionless coating is contemplated, including ultra-repellant surfaces or liquid-impregnated surfaces and materials, such as slippery liquid infused porous surface (SLIPS). Further examples of substantially frictionless surfaces or coatings include "ceramic alloys," or "cermets," which may be created by combining a metal alloy with a ceramic compound. For example, a metal/ceramic alloy such as boron, aluminum, or magnesium ($AlMgB_{14}$) may be combined with the cermetic compound of titanium diboride ($TiB_2$) to provide a near-frictionless coating for the contact surface 134 of the external accessory device 130.

Additionally or as an alternative, the outer surface of the spherical housing 102 can be include any of the above substantially frictionless coatings or compounds discussed with respect to the contact surface 134 of the external accessory device 130. Accordingly, any combination of substantially frictionless coatings or compounds may be incorporated with respect to the outer surface of the spherical housing 102 and the contact surface of the external accessory device 130.

Furthermore, the spherical housing 102 may be formed to include an inner surface 104 more conducive to providing added friction using, for example, a rubber compound or other suitable synthetic compound, such as a silicone. Additionally, the spherical housing 102 may be formed to include an outer surface having near-frictionless properties using coatings or compounds discuss above.

In the above examples, when the self-propelled device 100 moves, the external accessory device 130 can remain magnetically coupled to the spring end 110 at a substantially constant position on top of the self-propelled device 100. As such, while the self-propelled device 100 is being maneuvered, the biasing mechanism 115 may have a variable tilt angle (polar angle ($\theta$) relative to the plane of motion) that remains somewhat minimal, but in most cases, does not typically exceed 45 degrees, except during periods of relatively extreme acceleration. However, during continuous and stable maneuvering of the self-propelled device 100, the tilt of the biasing mechanism 115 may be closer to zero degrees, or within 10 degrees. Furthermore, during maneuvering, the azimuth ($\varphi$) can vary at any angle depending on independent power transferred from the motors 122, 144 to the wheels 118, 120.

Figure 2:
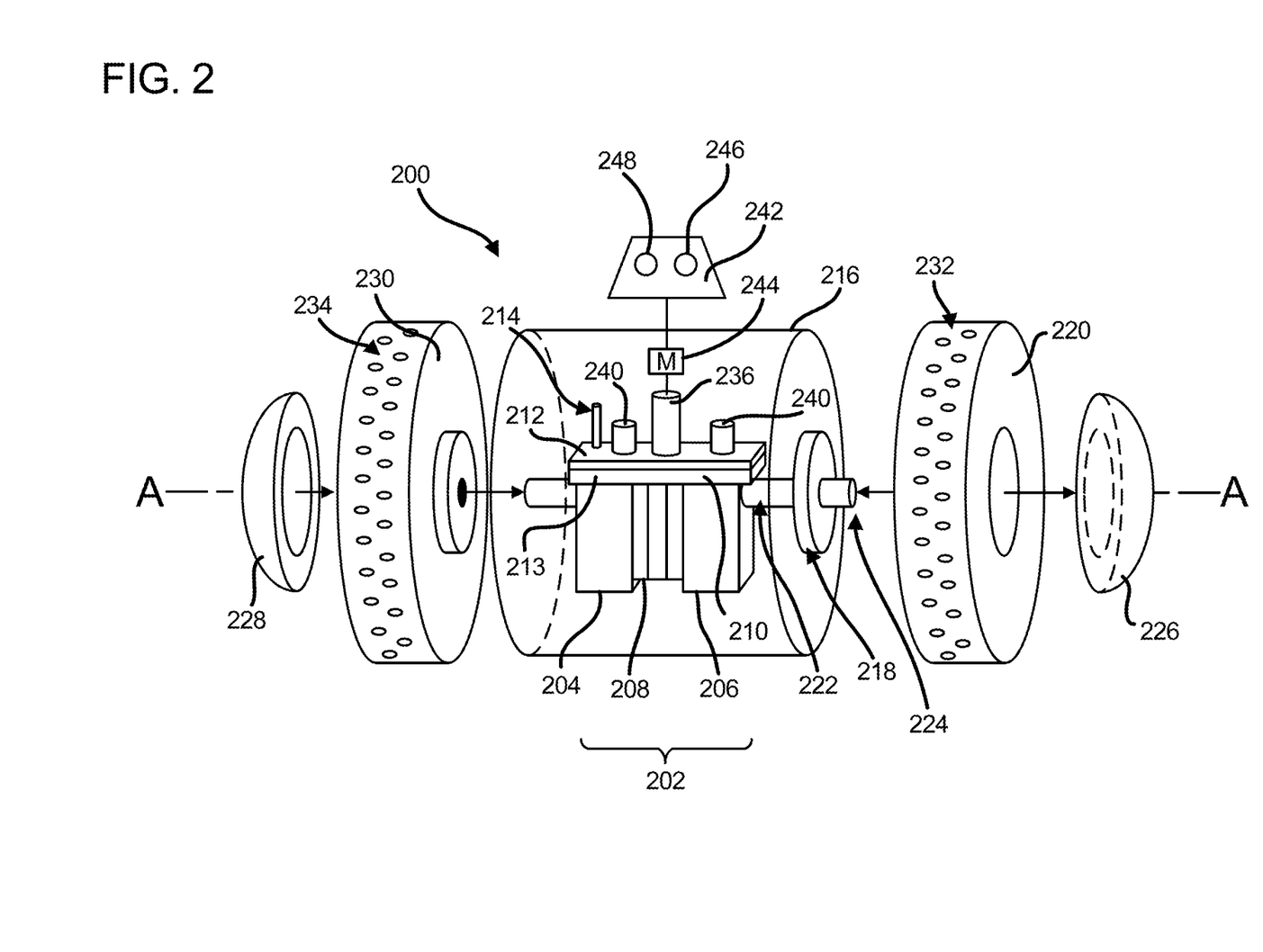
FIG. 2 depicts an exploded perspective view of a second example of a robotic device.

FIG. 2 depicts an exploded perspective view of an example of a cylindrical self-propelled device 200. A drive system 202 includes a first motor 204 and a second motor 206 with respective axles, one or more power units 208, a carrier 210, a circuit board 212 supporting a processor 213 and other components as described below, and a receiver 214 which can be configured or included as any variety of wireless communication standards and/or technologies.

The above components are included within a body 216 of the self-propelled device 200. Furthermore, any combination of the above features can be configured to be rigidly fixed to the body 216. For example, the carrier 210 can be mounted or otherwise attached to an inner portion of the body 216. Alternatively, any number of interior components of the self-propelled device 200 can be coupled to the inner portion of the body 216. Accordingly, due to the interior components being rigidly fixed to the body 216, the body 216 can rotate in conjunction with the rotational pitch of the drive system 202 when the self-propelled device 200 is being maneuvered.

The body 216 is substantially cylindrical in shape and can include any number of designs and features. For example, the body 216 can be at least partially transparent such that light from an internal light-emitting component disposed within the body 216 is apparent from outside of the device 200. The internal light-emitting component can be any type of illuminating element, such as one or more light-emitting diodes (LEDs) or one or more LED arrays. The illuminating element can be affixed to the carrier 210, or any other interior component of the self-propelled device 200. As an addition or alternative, the body 216 can be manufactured of sealed polycarbonate plastic or other composite that can be textured to diffuse light from the internal illuminating element.

Furthermore, the body 216 may be composed of a material that allows for transmission of signals used for wireless communication. Still further, an outer surface of the body 216 can be a material that is substantially impervious to moisture and every day wear and tear. The body 216 can be detachable from the self-propelled device 200 to allow for access to the interior components, and may further be durable, washable, and/or shatter resistant.

As an addition or alternative, the body 216 can include fastening or attachment points to allow for removable accessories to be attached to the exterior of the body 216. As discussed in further detail below, these accessories may include, for example, an attachable head lamp or a trailer attachment.

A gear 218 for a particular wheel 220 can be molded or formed at least partially within an interior portion of the wheel 220. Alternatively, the gear 218 can be included as a portion of a power train in which the motor 206 is coupled to an axle 222 and gear 218 combination. Accordingly, the axle 222 and gear 218 combination may then be fitted to the wheel 220. Alternatively, an axle and gear combination can be formed at least partially within an interior portion of a wheel.

Still further, a wheel hub 224 can be (i) formed at least partially within an outer portion of a respective wheel (not shown), (ii) formed in combination with a gear within an inner radius of a wheel (also not shown), or (iii) part of the power train attached to the gear 218 and axle 222. In the latter example, the wheel hub 224 can be a part of or coupled to the axle 222, and can further be configured to protrude from the outer portion of the wheel 220. The self-propelled device 200 can further incorporate removable hub covers 226, 228 that can be readily attached and detached from the wheel hubs 224. The hub covers 226, 228 may come in a variety of different colors and/or styles. Alternatively, the hub covers 226, 228 can be affixed semi-permanently to the wheel hubs 224. The hub covers 226, 228 may be made from a hard or soft plastic, plastic/rubber composite or compound, metal, or any other suitable material.

The wheels 220, 230 can allow for wheel coverings 232, 234 (e.g., tires) to be fitted over them. The wheel coverings 232, 234 can be removable and be formed of a soft rubber compound. However, the wheel coverings 232, 234 are not limited to soft rubber, and may be made of any compound. The wheel coverings 232, 234 may include any number of tread patterns for specialized or simply stylistic purposes. The wheel coverings 232, 234 can also come in a variety of different styles and/or colors according to a user's preference. In variations, the wheels 220, 230 have the same or substantially the same height as the body 216, and the wheel coverings 232, 234 can allow for a slight height advantage of the wheel and tire combination with respect to the body. Alternatively, the wheels 232, 234 can be significantly larger in height than the body 216. Differential rotation of the wheels 220, 230 causes turning of the self-propelled device 300, however, unlike the spherical self-propelled device of FIG. 1, the axis A about which the housing 216 rotates tends not to tilt. Much like the example depicted in FIG. 1, the self-propelled device 200 may also include a gyroscope 236 secured to the carrier 210, as well as one or more accelerometers 240.

The device 200 may also include an accessory device 242. The accessory device 242 may be actively moved (e.g., rotated, pivoted, tilted) via an accessory motor 244, which may be connected, directly or indirectly, to the carrier 210. Configurations of components utilized to indirectly couple the accessory device 242 to the body 216 are known in the art and include pairs of magnets or magnet sets that hold the accessory device 242 in sliding contact with the body 216. These components may be coupled via a chassis or other structure to the motor 244, which allows the motor 244 to move the accessory device 242, even if a physical connection of the accessory device 242 to the body 216 is not present. In this example, output elements are disposed in both the body 216 and the accessory device 242. More specifically, output elements in the body 216 may include the first motor 204 and/or the second motor 206. Another output element is the accessory motor 244, which can move the accessory device 242. In the accessory device 242 itself, output elements may include a light 246, as well as a speaker or other sound emitter 248.

Figure 3:
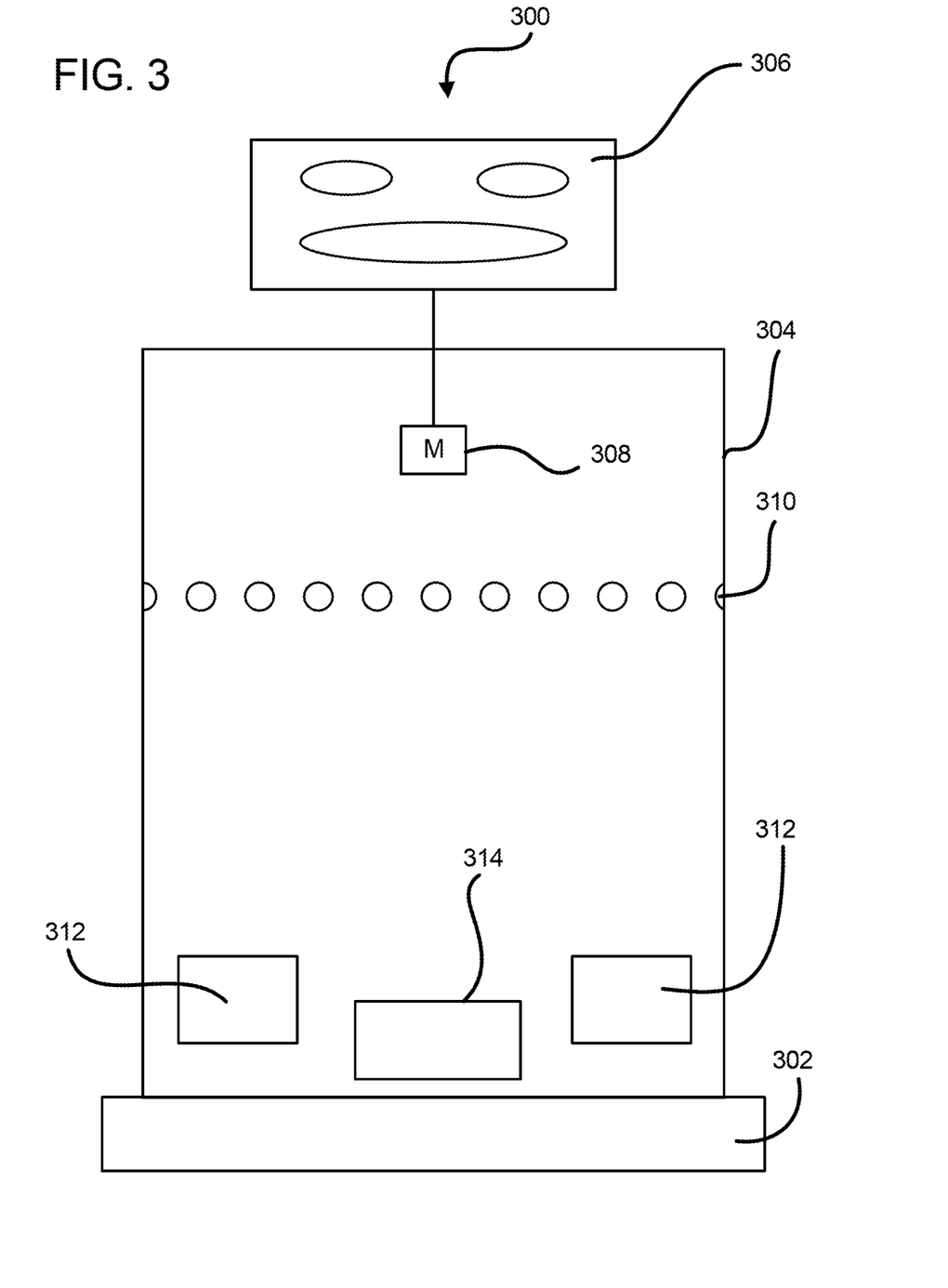
FIG. 3 depicts a perspective view of a third example of a robotic device.

FIG. 3 depicts a perspective view of a third example of a robotic device 300, in this case a stationary robot device 300, which does not move under its own power. The device 300 includes a base 302 and a body 304 mounted thereto. An accessory device 306 may also be included and may be movably connected to the body 304 via a motor 308. In this example, output elements may include one or more lights 310, speakers or other sound-emitting elements 312, or the motor 308 itself. A processor 314 is communicatively coupled to the various components described above, either via wired or wireless connections.

The technologies described herein may be incorporated into a self-propelled robotic device or may be utilized with a stationary robotic device such as an interactive toy, or a computer peripheral. The technologies described allow for detection of a presence and/or approach of an entity, for example, a human user of a robot, a human non-user of the robot, an animal, a vehicle, etc. In another aspect, the technologies described herein may allow for the detection of forces applied to the robot (e.g., a lifting, kicking, or other force). Such forces may be distinguished from forces acting upon the robot that result from robot movements or actions (e.g., the force resulting from a robot driving into a wall). These detection technologies may improve the user experience, for example, by allowing the robot to detect a person in proximity to the robot, and perform a responsive action (e.g., a greeting, a movement, a light emission, or other action). The robotic device may also be programmed or utilize machine-learning to differentiate between different vibrations that may be indicative of different entities. For example, different magnitudes and patterns of footsteps may allow the robot to differentiate between the approach of, for example, an adult, a child, or a dog. The actions taken in response to particular detections may differ.

The technologies also allow the robot to interact with humans whether or not they are users of the robot, or possess a control device (such as a smartphone or stand-alone device). Typically, robots may detect such control devices via a wireless signal when the user is in proximity thereto. However, the technologies described herein allow the robot to detect the presence or approach of other people than simply the user. With this detection, the robot may issue a warning, a greeting, or take some other action. In a particular example, the robot may detect the presence of a dog or other pet and, if appropriately programmed, emit a warning or take another action. This may allow the robotic device to act as a behavioral modifier to the pet for training purposes (for example, by emitting a sound, light, or taking another distracting action) if the pet, for example, enters an off-limits room or jumps on furniture. Other features, actions, and functionalities related to the technologies described are provided below.

Figure 4:
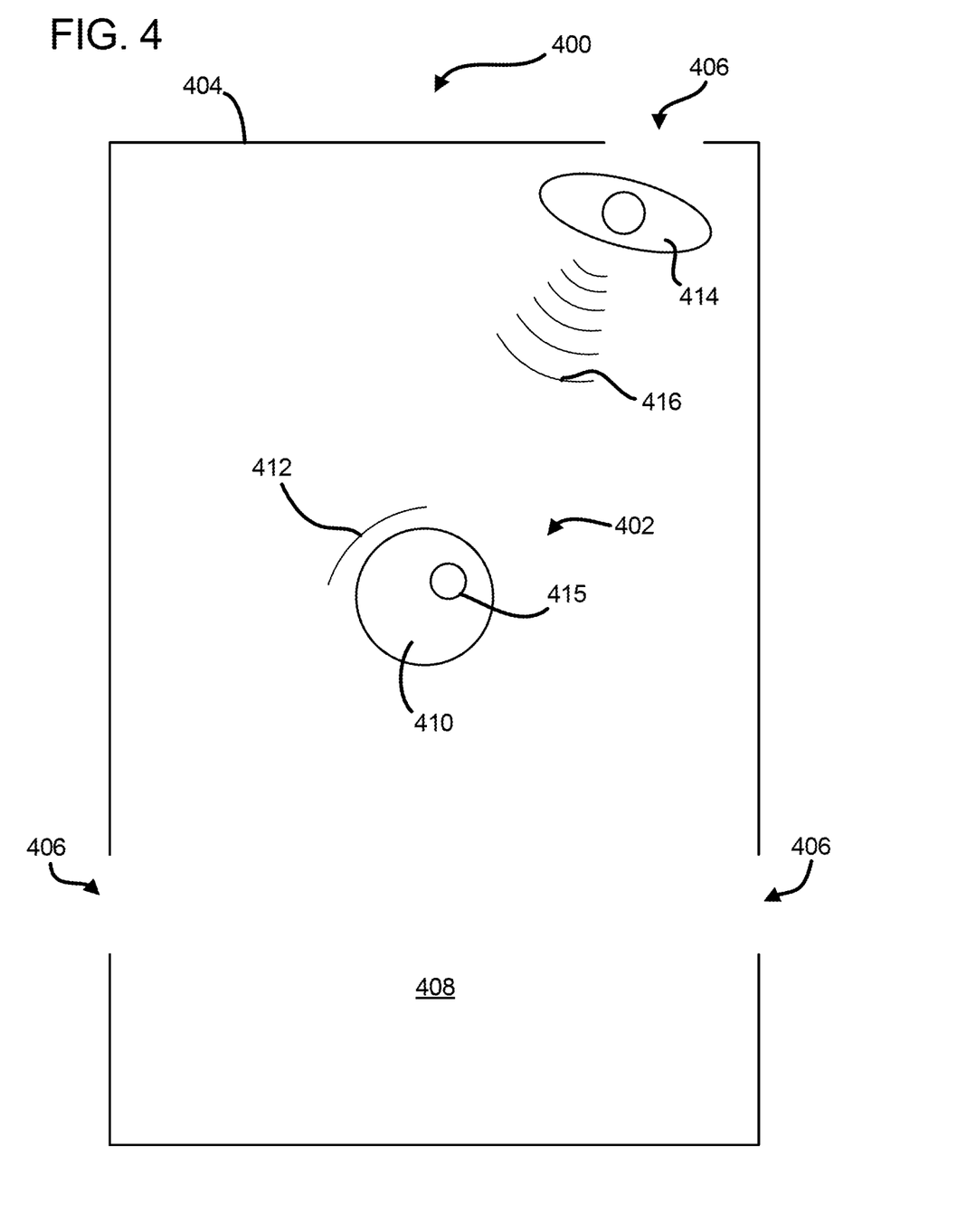
FIG. 4 depicts an example of an environment in which a robotic device operates.

FIG. 4 depicts an environment 400 (here a room) in which a self-propelled or stationary robotic device 402 may operate. The room 400 is bounded by a number of walls 404 defining a plurality of openings (e.g., doorways) 406. The device 402 rests on a floor 408. In other examples, the environment may be a table top, outdoor area, or other environment in which the device 402 is located. The device 402 may include a body 410 and a face feature 412. For the purposes of this disclosure, a face feature 412 may be an electronic or fixed representation of a face, head, eyes, or other feature typically recognized by humans and/or animals that conveys a direction in which the device 402 is "facing" or "looking."

To detect an approach or presence of an entity 414, accelerometers 415 within the robot 402 detect vibrations 416 transmitted from the entity 414 through the floor 408 and to the robot 402. Vibrations that meet a predetermined condition may be indicative of the presence of the entity 414 within the environment 400. In other words, the vibrations 416 may be the result of steps the entity 414 takes to enter the room 400. Additionally, vibrations of entities passing outside of the environment 400 (e.g., past a door 406), or moving within the environment 400 may also be detected.

Figure 5:
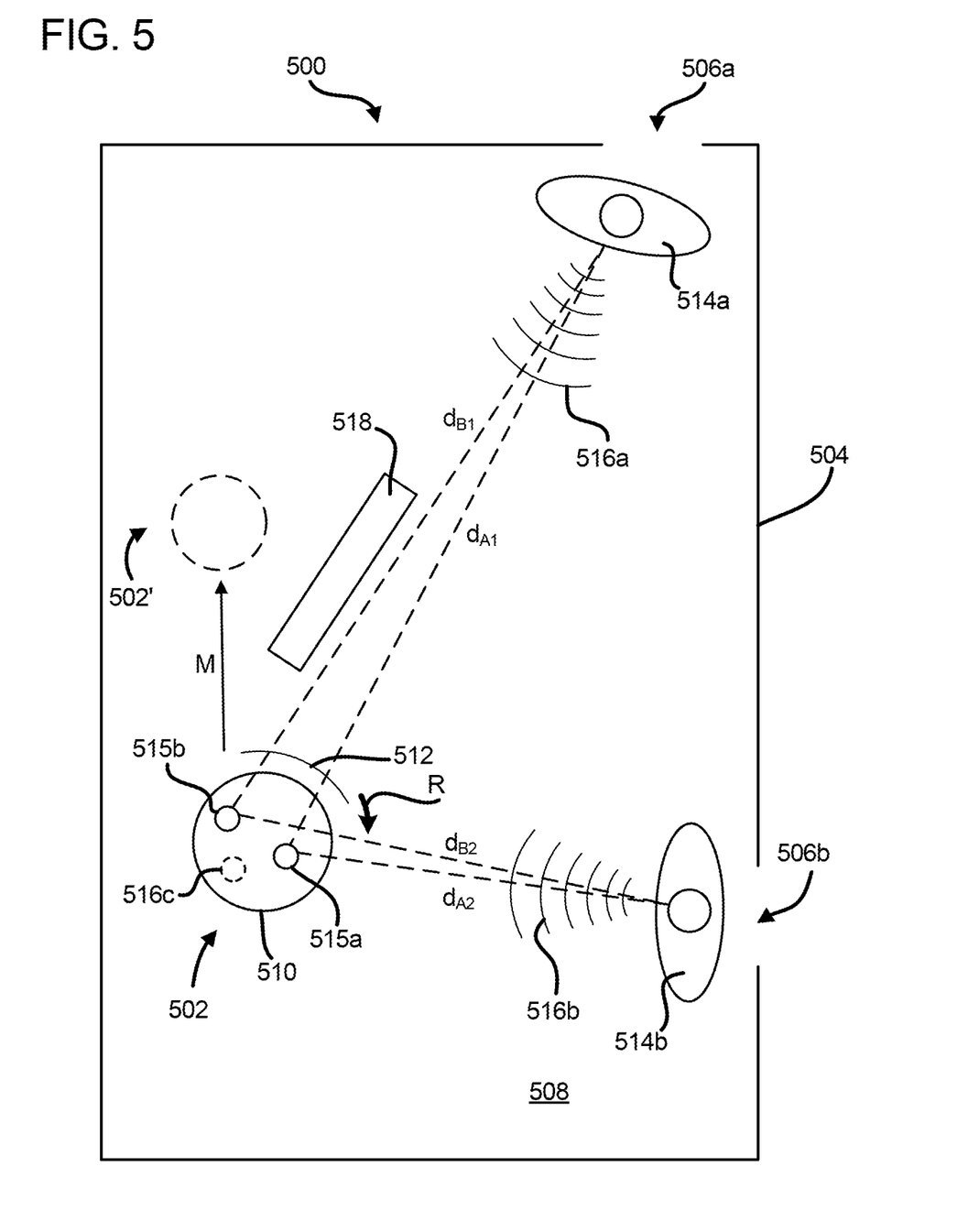
FIG. 5 depicts another example of an environment in which a robotic device operates.

FIG. 5 depicts an environment 500 in which a robotic device 502 (self-propelled or stationary) may operate. The room 500 is bounded by a number of walls 504 defining a plurality of openings (e.g., doorways) 506a, 506b. The device 502 rests, in this case, on a floor 508. The depicted device 502 includes a face feature 512, as well as two accelerometers 515a, 515b in the body 510 thereof. In the robotic device 502 depicted in FIG. 5, only two accelerometers 515a, 515b are depicted for clarity. A commercial implementation of the device 502 may utilize at least three accelerometers, with the third accelerometer 516c being utilized to confirm the direction of vibration when vibrations received by the two accelerometers 515a, 515b are determined to be equidistance to both of the two accelerometers 515a, 515b. Such a condition may occur when the vibrations are generated from a source either directly "in front" of the device 502 or directly "behind" the device 502. Thus, the third accelerometer 515c would be utilized to determine the source of the vibrations under such conditions. Regardless, in this figure, only accelerometers 515a, 515b (as well as the distances related thereto), are depicted for clarity.

Two entities 514a, 514b are also depicted in FIG. 5, so as to describe the presence direction-finding features of the device 502. Entity 514a enters the environment 500 through doorway 506a, thus generating vibrations 516a (associated with steps the entity 514a may take). The vibrations 516a are detected by the two accelerometers 515a, 515b. The signals sent from the accelerometers 515a, 515b to the processor (not shown) are processed and compared. Differences in magnitude of the vibration detected at each accelerometer 515a, 515b may be determined. Alternatively or additionally, the differences in time at which the vibrations 516a are received at the accelerometers 515a, 516b may be compared. Regardless, the comparison allows the processor to determine a distance from each accelerometer 515a, 515b to the source of the vibration 516a (e.g., the entity 514a). As the two distances $d_{A1}$ and $d_{B1}$ are substantially similar, the processor is able to determine a relative position of the device 502 relative to the entity 514a. In this case, since the positions of the accelerometers 515a, 515b within the body 510 are known, the device 502 is able to determine that the entity 514a is in a direction in which the face feature 512 is presently pointed in FIG. 5.

A different position of an entity 514b relative to the device 502 is also depicted in FIG. 5. In this case, entity 514b enters the environment 500 via doorway 506b, thus generating vibrations 516b that propagate through the floor 508 towards the device 502. In this case, the vibrations 516b are detected by the two accelerometers 515a, 515b and processed and compared, e.g., as described above. In this case, a first distance $d_{A2}$ is less than a second distance $d_{B2}$. This allows the processor to determine a relative position of the device 502 relative to the entity 514b. In this case, the entity 514b is located in a direction away from the face feature 512 and to the right of the device 502. As such, the device 502 may take an action to rotate R the face feature 512 (or body 510, depending on the configuration of the device 502) so as to generally face the entity 514b. As relates to the robotic devices depicted above in FIGS. 2 and 3, the feature 512 may correspond to the accessory device 242, 306 that may be rotated separate from the body of the robot. Thus, by rotating this feature, the impression provided to the entity 514b is that the device 502 is looking at the entity 514b.

In examples where the robot 502 is self-propelled (e.g., the robots 100, 200 of FIGS. 1 and 2, respectively), movement actions also or alternatively may be taken. For example, the self-propelled device 502 may back away from the entity 514b, move M to a position 502' behind an object 518 so as to "hide" from the entity 514b, or take another action. Other actions contemplated include evasive or approach maneuvers, emissions of light or sound, jumping or spinning in place, or other actions as required or desired for a particular application so as to communicate various states and conditions to the entity 514b. This increases the interactivity between the self-propelled device 502 and the entity 514b. In another particular example, the self-propelled device 502 may be programmed to keep a pet (e.g., a dog) out of the environment 500. The self-propelled device 502 may position itself as desired in the environment 500 so as to readily detect an entry of the dog through one of the two doorways 506a, 506b. Upon detection, the self-propelled device 502 may rush towards the dog, optionally emitting light and/or sound, in an effort to compel the dog to leave the environment 500. Upon exit by dog, the self-propelled device 502 may take its initial position within the environment 500 and continue to await detection of vibrations indicative of the presence of the dog.

The vibrations detected by the accelerometers may be evaluated to determine whether those vibrations meet a predetermined condition indicative of an entity or a particular type of entity (e.g., adult, child, dog). The robot may contain memory that includes a library of patterns of vibrations. Such patterns of vibrations may be stored on a look-up table of the device that may be accessed by the processor. The patterns may aid the device in identifying the entity based on the patterns of vibrations generated by the entity. A non-exhaustive list of factors that may be considered in identifying the entity include, but are not limited to gait (or, rather, the resulting vibration) pattern, magnitude of detected vibration, direction of detected vibration (described in more detail above), peculiarities of vibration (e.g., the striking of a cane or sliding of a walker against the floor), etc. Any or all of these or other factors may be utilized to detect and identify the entity, and/or the location thereof.

A number of actions of a device may be taken depending on the signals received and processed by the processor, device settings, etc. Different actions may be taken based on whether the signals are sent from the gyroscope and/or the one or more accelerometers. These include emission of lights and/or sounds, certain of which may be dependent on the signal received from the gyroscope and/or accelerometer. In one example, the device may emit a scream from a microphone if the gyroscope and/or accelerometer(s) detects a significant, quick acceleration that may be consistent with being kicked or dropped. In another example, the device may emit pre-recorded or machine-generated speech such as "PUT ME DOWN" if the signals from the gyroscope are indicative of being picked up by an entity.

Figure 6:
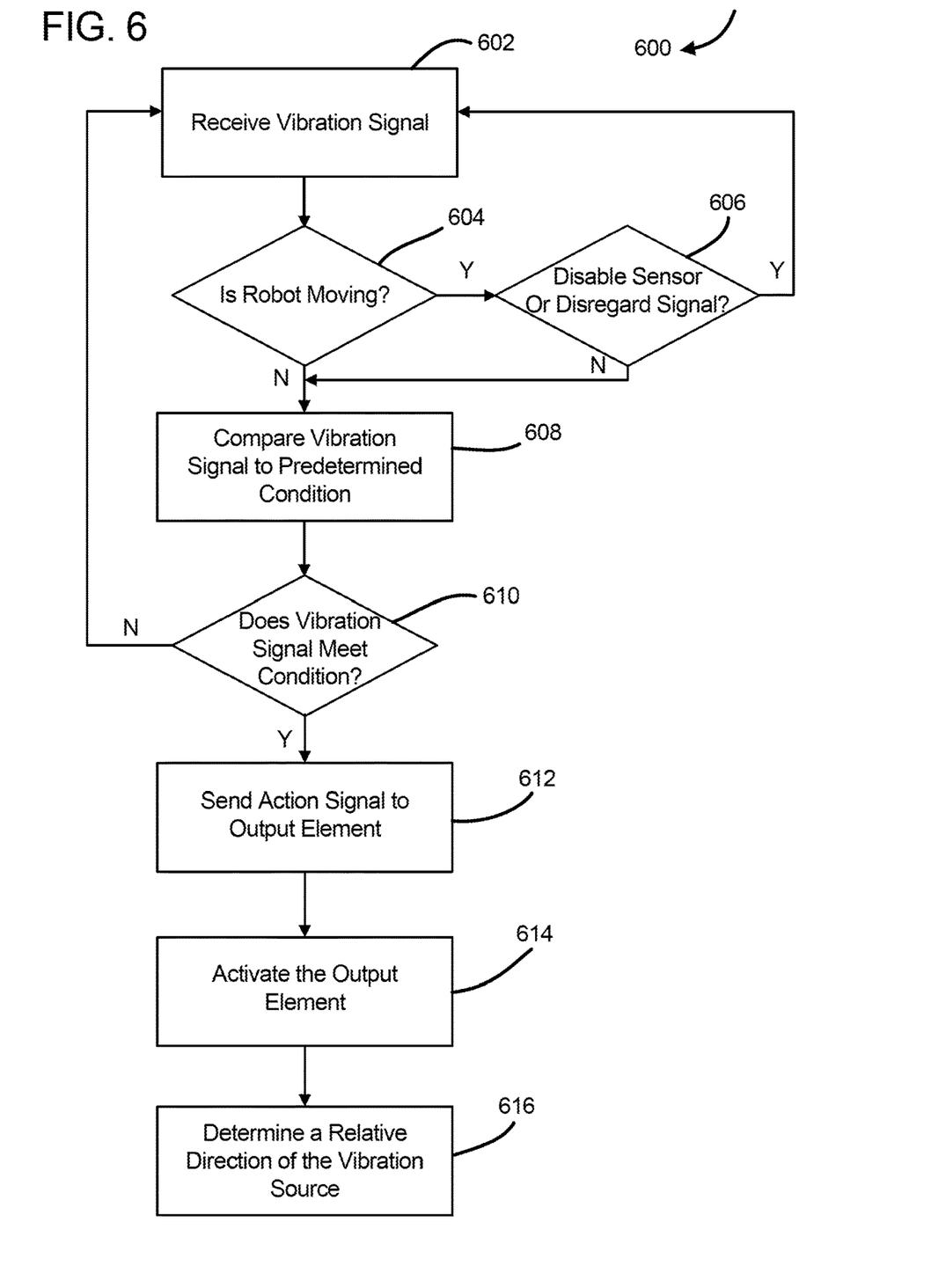
FIG. 6 depicts a method of detecting a presence of an entity.

FIG. 6 depicts a method 600 of detecting a presence of an entity. A vibration may be detected by an accelerometer of a robotic device, which sends an associated signal sent to a processor. The processor receives the vibration signal, operation 602. In optional operation 604, a processor of the robot may determine if the robot is moving, e.g., by measuring or detecting a motor output or via other processes. If the robot is, in fact moving, flow continues to operation 606, where the sensor that detected the vibration signal may be disabled, or the signal received therefrom may be disregarded. Flow may return to operation 602 if disabling or disregarding operations are performed. There may be a number of reasons to not disable the accelerometer or disregard the vibration signal, however. For example, if the accelerometer and/or processor has sufficient resolution, vibrations associated with the presence of an entity in an environment may be subtracted or distinguished from vibrations associated with movement of the robot. In such a case, detection of an entity may still be performed as the robot is moving.

If the robot is not moving, or if the disabling/disregarding operations are not performed, flow continues to operation 608, where the vibration signal is then compared to a predetermined condition. As noted above, the predetermined condition may be related to one or more of a magnitude, a time, a phase, and a pattern. In examples, multiple comparisons to multiple conditions may be utilized to confirm results of a contemporaneous comparison so as to increase the accuracy of the presence detection, as well as to identify the specific entity detected. If the signal does not meet the condition, operation 610, flow returns to operation 602. As used herein, "meeting the condition" may mean exceeding a minimum threshold required for accurate determination; not exceeding a maximum threshold for entity identification (e.g., a weaker vibration may result in identification of a pet instead of a human); being substantially similar to a known pattern to distinguish a first known human from a second known human; etc. Other examples of how the signal meets the predetermined condition are contemplated.

In one example of the method 600, a robot located in an environment may simply determine the presence of an entity in that environment, then take certain actions based thereon. Such a method is generally consistent with the robot actions described with regard to FIG. 4. In such a case, if the vibration meets the predetermined condition, an action signal may be sent to one of the output elements (e.g., motor(s), light(s), speaker(s)), operation 612. Such an action signal may activate one or more of the output elements, operation 614, thus allowing the robot to appear to interact with or respond to the entity present. In yet another optional operation, the method contemplates the robot determining a relative direction of the vibration source, operation 616, e.g., as depicted and described with regard to FIG. 5. Such an operation contemplates a device that includes multiple accelerometers, where multiple signals are compared, as described elsewhere herein. Thus, if multiple accelerometers are used in a device, not all of the signals must meet the predetermined condition to move beyond operation 608. Relative to operation 616, however, multiple signals received in operation 602 are compared to determine the relative direction, even if one such signal, alone, does not exceed the threshold. In other examples, both signals must exceed a threshold before any determination as to relative direction is made. As described herein, certain of these operations are optional, depending on the complexity of the device, sensitivity and number of accelerometers, and memory capacity of the device. Further, operations 612-616 may be performed in parallel or in any sequence, thus allowing the relative direction of the vibration source (operation 616) to inform, at least in part, the action signal sent (operation 612) and the output element activated (operation 614).

Figure 7:
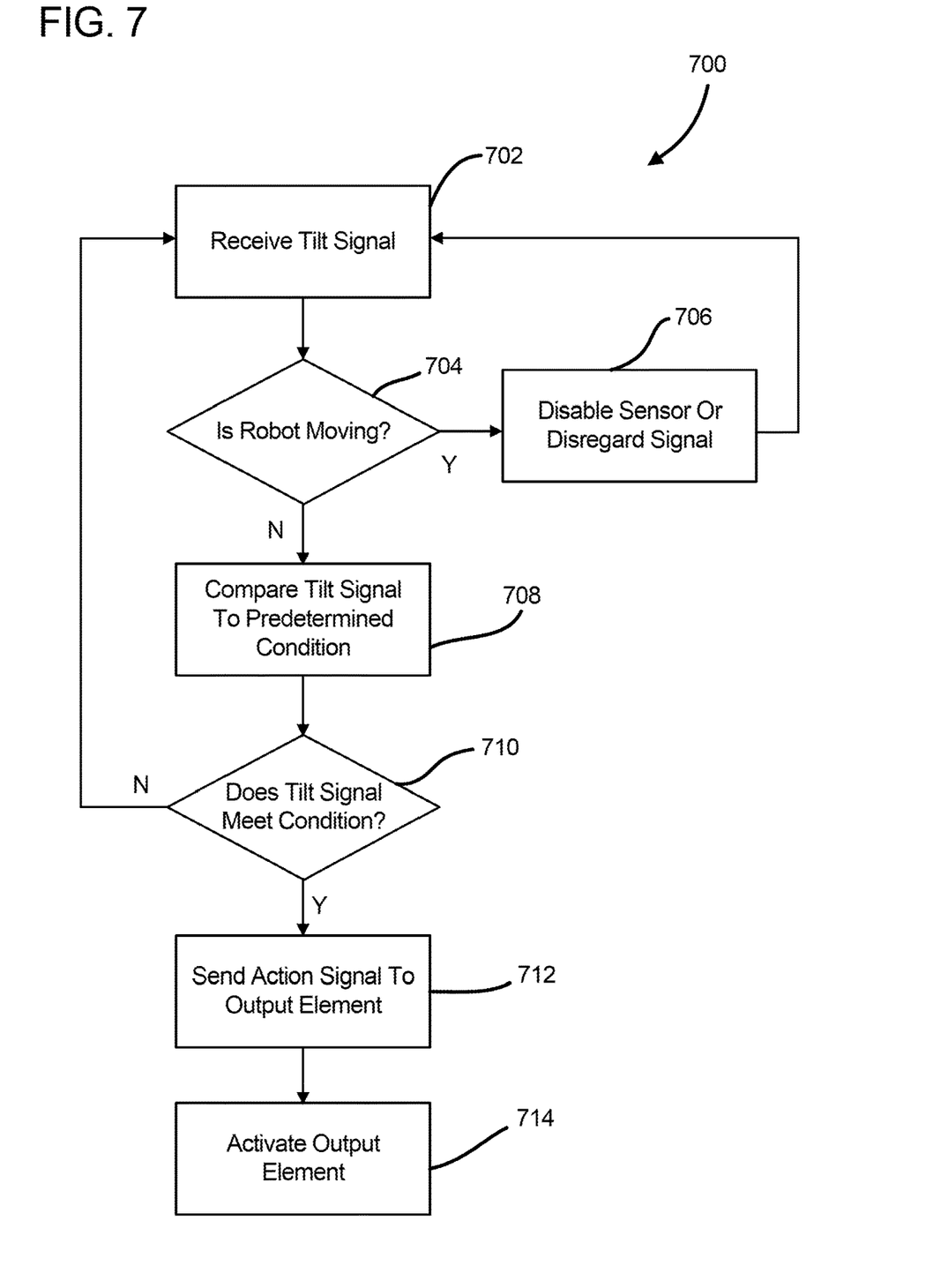
FIG. 7 depicts a method of detecting a manipulation of a device.

FIG. 7 depicts a method 700 of detecting a manipulation of a robot. A tilt may be detected by gyroscope of a robotic device, which sends an associated signal sent to a processor, where it is received, operation 702. In optional operation 704, a processor of the robot may determine if the robot is moving, e.g., by measuring or detecting a motor output or via other processes. If the robot is in fact moving, flow continues to operation 706, where the sensor that detected the vibration signal is disabled, or the signal received therefrom is disregarded. Flow then returns to operation 702. The disabling/disregarding operations prevent any tilting inherent in robot movement from being confused by the processor as a manipulation. In operation 708, the vibration signal is then compared to a predetermined condition. As noted above, the predetermined condition may include one or more of a magnitude, a time, a phase, and a pattern. In examples, multiple comparisons to multiple conditions may be utilized to confirm results of a contemporaneous comparison. If the signal does not meet the condition, operation 710, flow returns to operation 702. If the tilt signal meets the predetermined condition, an action signal may be sent to one of the output elements (e.g., motor(s), light(s), speaker(s)), operation 712. Such an action signal may activate one or more of the output elements, operation 714, thus allowing the robot to act in response to the manipulation.

While FIG. 7 is directed to detecting a manipulation (such as being lifted or kicked), the gyroscope may also be utilized for presence detection (as described in conjunction with FIG. 6, for example). For example, if the robotic device is resting, unmoving, on a soft surface such as a piece of furniture, and experiences a tilt, the gyroscope may send a signal to the processor. If the signal is meets a predetermined condition, this may be indicative of a person or pet sitting on the piece of furniture. In such a case, the robot device may also take an action.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A robotic device comprising:
    a body;
    an output element disposed in the body;
    at least one of:
        an accelerometer disposed within the body, wherein the accelerometer sends an accelerometer signal in response to a detection of a vibration external to the body; and
        a gyroscope disposed within the body, wherein the gyroscope sends a gyroscope signal in response to a detection of movement of the body; and
    at least one processor disposed in the body, the at least one processor communicating with at least one of the accelerometer and the gyroscope, wherein the processor receives at least one of the accelerometer signal and the gyroscope signal, and wherein in response to receiving the at least one of accelerometer signal or the gyroscope signal, the processor performs operations comprising:
        determine if the robotic device is moving; and
        when the robotic device is not moving, send an action signal to the output element based at least in part on receipt of at least one of the accelerometer signal and the gyroscope signal.

2. The robotic device of claim 1, wherein the received signal is the accelerometer signal.

3. The robotic device of claim 1, wherein the received signal is the gyroscope signal.

4. The robotic device of claim 1, wherein the output element comprises at least one of a speaker, a light, and a motor.

5. The robotic device of claim 4, wherein the motor comprises at least one of a body motor and an accessory motor.

6. The robotic device of claim 1, wherein the action signal is sent when at least one of the accelerometer signal and the gyroscope signal meet a predetermined condition.

7. The robotic device of claim 6, wherein the predetermined condition of the accelerometer signal corresponds to at least one of a vibration in excess of a threshold and a vibration substantially matching a predetermined pattern.

8. The robotic device of claim 1, wherein the at least one of the accelerometer signal and the gyroscope signal are sent when at least one of the vibration and the movement meet a predetermined condition.

9. A method of controlling a robotic device comprising a body, the method comprising:
    receiving a vibration signal from an accelerometer disposed in the body;
    receiving a gyroscope signal from a gyroscope disposed in the body;
    comparing the vibration signal to a first predetermined condition;
    comparing the gyroscope signal to a second predetermined condition;
    determining if the robotic device is moving; and
    when the robotic device is not moving, sending an action signal to an output element if at least one of (1) the vibration signal meets the predetermined condition and (2) the gyroscope signal meets the second predetermined condition.

10. The method of claim 9, further comprising activating the output element based on the action signal.

11. The method of claim 10, wherein the output element comprises at least one of a motor, a light, and a speaker.

12. The method of claim 11, wherein the motor comprises at least one of an accessory motor and a body motor.

13. The method of claim 9, wherein at least one of the first predetermined condition and the second predetermined condition each comprise a magnitude, a time, a phase, and a pattern.

14. The method of claim 9, further comprising disabling at least one of the accelerometer and the gyroscope when the robotic device is moving due to a motor output.

15. The method of claim 9, further comprising disregarding at least one of the vibration signal and the gyroscope signal when the robotic device is moving due to a motor output.

* * * * *